United States Patent [19]

Robello et al.

[11] Patent Number: 5,008,369
[45] Date of Patent: Apr. 16, 1991

[54] PREPARATION OF POLYSULFONES

[75] Inventors: Douglas R. Robello, Webster; Abraham Ulman, Rochester, both of N.Y.

[73] Assignee: Eastman Kodak Company, Rochester, N.Y.

[21] Appl. No.: 430,039

[22] Filed: Nov. 1, 1989

[51] Int. Cl.$^5$ .................... C08G 75/14; C08G 75/18; C08G 75/20
[52] U.S. Cl. .................................... 528/391; 528/388
[58] Field of Search ............................... 528/388, 391

[56] References Cited

U.S. PATENT DOCUMENTS

| T919,002 | 1/1973 | Rose et al. | 525/534 |
|---|---|---|---|
| 3,594,446 | 7/1971 | Gablet et al. | 525/534 |
| 3,634,355 | 1/1972 | Barr et al. | 528/391 |
| 3,886,120 | 5/1975 | Yagi et al. | 528/128 |
| 3,928,295 | 12/1975 | Rose | 528/226 |
| 3,951,918 | 4/1976 | Jones | 528/175 |
| 4,010,147 | 3/1977 | Rose | 528/125 |
| 4,051,109 | 9/1977 | Barr et al. | 528/175 |
| 4,105,635 | 8/1978 | Freeman | 528/126 |
| 4,256,862 | 3/1981 | Binsack et al. | 525/534 |
| 4,268,635 | 5/1981 | Hoy et al. | 525/68 |
| 4,486,526 | 12/1984 | Colon et al. | 525/471 |

FOREIGN PATENT DOCUMENTS 1806993 11/1968 Fed. Rep. of Germany .
3616063 5/1986 Fed. Rep. of Germany .

OTHER PUBLICATIONS

Vogel, H. A., J. of Polymer Science: Part A-1, vol. 8, 2035–2047 (1970).
Sato et al. Makromol. Chem., Rapid Commun. 3, 821–824 (1982)
Sato, Makromol. Chem., Rapid Commun. 5, 151–155 (1984).
Sato et al., Makromol. Chem. 185, 629–634 (1984).
Hale et al., J. of Polymer Science: Part A-1, vol. 5, 2399–2414 (1967)
Lenz et al., J. Polym. Sci. 38, 351 (1962).

Primary Examiner—Harold D. Anderson
Assistant Examiner—T. Mosley
Attorney, Agent, or Firm—Robert A. Linn

[57] ABSTRACT

In a preferred embodiment, poly(4-phenylsulfone) is prepared by self-condensation of sodium 4-fluorophenyl sulfinate. The process is initiated by a small quantity of 4,4'-difluorophenylsulfone. The process is conducted in the presence of a dipolar, aprotic solvent such as dimethylsulfoxide. The reaction is conducted at a mildly elevated temperature, preferably within the range of from about 100° C. to about 200° C.

11 Claims, 1 Drawing Sheet

TGA OF POLY (p-phenylenesulfone)

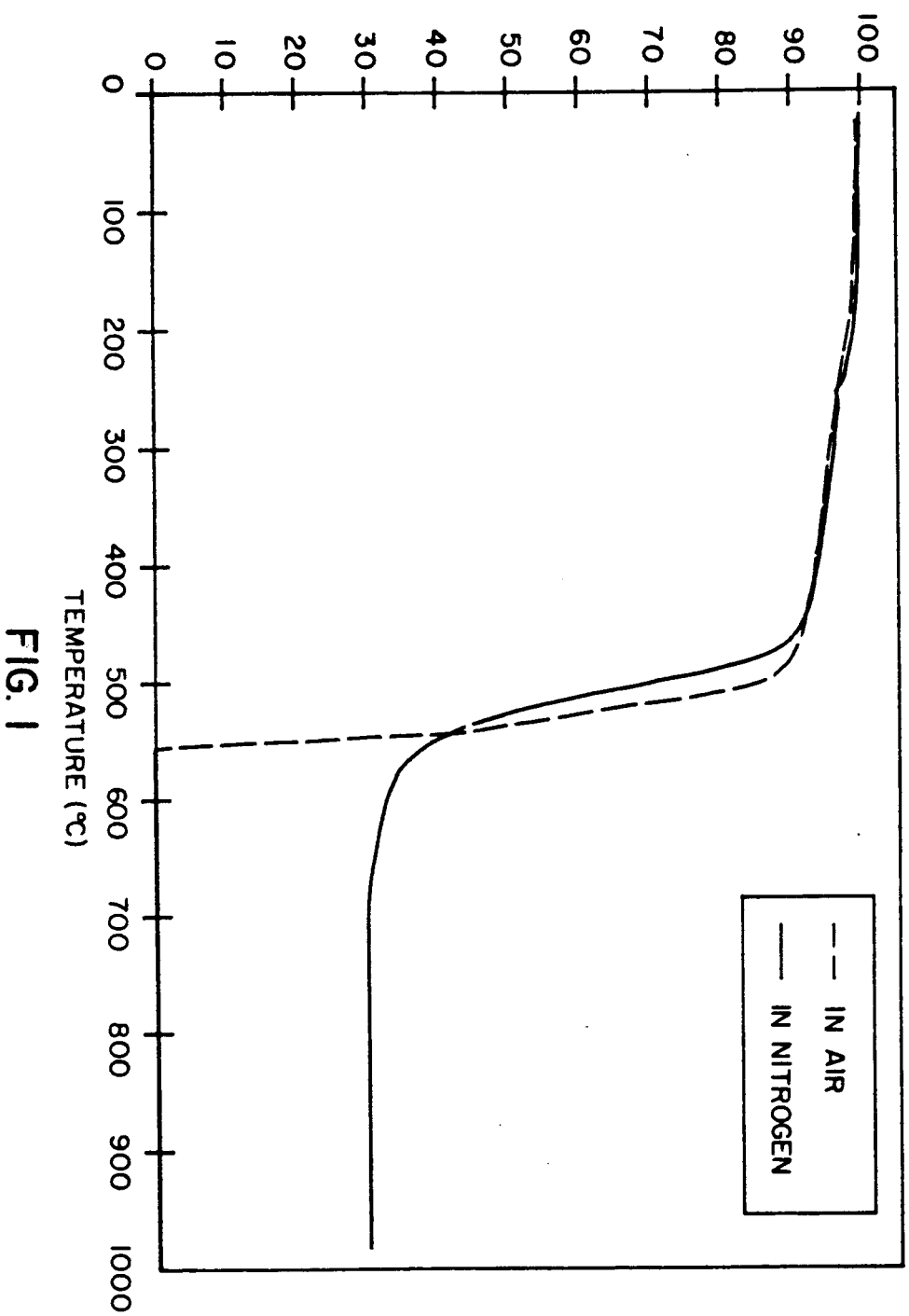

PREPARATION OF POLYSULFONES

FIELD OF THE INVENTION

This invention relates to the preparation of aromatic polymers. More particularly, it relates to the preparation of poly(aryl sulfones). The process of this invention comprises a self-condensation of a haloaromatic sulfinate salt. The condensation is initiated by an aromatic compound having at least one leaving group. The process involves aromatic nucleophilic substitution.

BACKGROUND OF THE INVENTION

It has been known for about 30 years that poly(aryl ethers), poly(aryl thioethers) and simple aryl sulfones have high thermal stability. For example, it has been known that diphenyl sulfone can be heated to about 470° C. before noticeable decomposition occurs. Also, it has been known that di-p-tolyl sulfone can be distilled at 430° C. without decomposition. These observations have suggested that poly(aryl sulfones) will also have high thermal stability. Accordingly, there has been considerable effort expended in the art to prepare polymers of this type.

Prior workers have shown that the preparation of poly(aryl sulfones) is not an easy task. Several approaches have been taken by prior workers to overcome this problem.

One prior art approach is to use a sulfone which has two aromatic rings, and two halogens (one on each ring) as a monomer. This type of reactant is copolymerized with a disodium salt of a dihydric phenol. An example of this type of polymerization is the reaction of 4,4'-dichlorodiphenyl sulfone with the disodium salt of Bisphenol A. As known in the art, the Bisphenol A salt can be substituted with salts of other dihydric phenols.

A problem with this type of reaction is the restriction to use of dihalodiarylsulfones as reactants. Furthermore, use of this type of reactant results in a copolymer having both the desired sulfonyl groups and less desired ether groups bridging aromatic rings. A third problem is that the reaction requires a comonomer amount of the aromatic dihalide.

Polysulfones have also been made by reacting aromatic sulfonyl halides using Friedel-Crafts catalysts, as in U.S. Pat. No. 3,951,918 infra. Friedel-Crafts catalysts are moisture sensitive, and corrosive. For these reasons use of such catalysts also presents problems to be overcome.

A third prior art approach to preparing aromatic polysulfones is the use of an activated aromatic dihalide and an aromatic disodium disulfinate as reactants. Such a reaction is suggested by Sato et al in their 1982 publication cited below. A problem with this approach is the need of an activated co-reactant, such as bis(4-chloro-3-nitrophenyl) sulfone. This approach also uses co-monomer amounts of each reactant, and requires use of a tetraalkylammonium salt as a catalyst.

A fourth approach suggested in the art is the preparation of a polysulfide, followed by oxidation to a polyarylsulfone. This type of process is set forth in the United States Technical Disclosure cited below. As can be seen by referring to the reference, this approach has been suggested for preparation of aromatic block copolymers. A problem with this approach is that it is not straightforward, since it requires two reactive steps and two product isolations. It also requires co-monomer amounts of reactants. The oxidation is conducted in the presence of glacial acetic acid, which can be corrosive if water is present. Also, poly(phenylene sulfide) is highly insoluble and difficult to contact with the oxidant in order to get complete reaction. Furthermore, peroxide oxidants used in this procedure must be correctly stored and used to prevent problems from occurring.

This invention solves the prior art problems noted above. It does not require two reactant materials present in about nearly equal molar amounts. It can prepare products which are devoid of oxygen linkages. It does not use a Friedel-Crafts catalyst or an onium catalyst, and it does not require two reaction steps or an oxidant.

Thus, by means of this invention there is provided a convenient, one-step synthesis of poly(aryl sulfones) which does not require a catalyst that is difficult to use or handle. Furthermore, by means of this invention there is provided for the first time a process for the self-condensation of a haloaryl sulfinate salt. Also, there is provided for the first time an initiator for starting the self-condensation of such salts. Stated another way, this invention comprises the discovery of initiation properties in certain, known types of compounds. It comprises (i) a self-condensation, and (ii) an aromatic nucleophilic substitution.

RELATED ART

U.S. Defensive Publication No. T919,002 discloses aromatic block copolymers which have phenylsulfonyl groups made by oxidation of aromatic polymers containing sulfide linkages.

U.S. Pat. No. 3,594,446 discloses linear polymers made by reacting a binuclear aromatic dihalide with a mixture of a sodium or potassium salts of a binuclear phenol and a binuclear thiophenol.

U.S. Pat. Nos. 3,634,355 and 4,051,109 disclose the preparation of polymers having phenyl rings linked by —$SO_2$— and —O— linkages. To prepare the polymers, an alkali metal hydroxide is reacted with a halogenophenylsulfonyl compound alone or together with a comonomer.

U.S. Pat. No. 3,886,120 discloses polymers having —O— and —$SO_2$— linkages made by copolymerizing a diphenolate with a dihalodiphenyl compound.

U.S. Pat. No. 3,928,295 and U.S. Pat. No. 4,010,147 disclose copolyketone/sulfones made by heating a dialkali metal salt of a bisphenol containing ketone linking groups with a dihalobenzenoid compound having halogen atoms activated by a sulfone.

U.S. Pat. No. 3,951,918 discloses a preparation of polyarylsulfones containing repeating units which have the formula —Ar—$SO_2$— wherein Ar is a bivalent aromatic radical derived from benzene, a polynuclear hydrocarbon or a compound containing two phenyl groups linked by a carbon—to—carbon bond, —O—, —S—, —SO—, —$SO_2$—, —CO—, a divalent hydrocarbon radical, or a residue of a diol. The group Ar may vary from unit to unit in the polymer chain produced. The patent discloses that polyaryl sulfones can be made by melting together a reagent H—Ar—$SO_2$X and/or an equimolar mixture of X$SO_2$—Ar—$SO_2$X and H—Ar—H in the presence of $SbCl_5$ or an iron salt that is soluble in the reaction mixture. The patent also discloses that the presence of diluents is usually avoided. The invention of the patent comprises preparation of the polyarylsulfones in the presence of a nitrobenzene solvent.

U.S. Pat. No. 4,105,635 discloses a preparation of polyethersulfones from a finely divided hydrated metal salt of a bisphenol and an aromatic dihalide in which the halogen atoms are activated. The process is conducted in an aromatic sulfone solvent.

U.S. Pat. No. 4,256,862 discloses polyaryl sulfones admixed with metal salts or ammonium salts of organic sulfonic acids.

U.S. Pat. No. 4,268,635 disclosed block copolymers containing ethersulfone units and ether ketone units, and a method of preparation of the copolymers.

U.S. Pat. No. 4,486,576 discusses coating materials which contain aryl sulfone moieties. The high temperature coating materials are prepared by a cross-linking reaction.

German Offen. No. 1,806,993 discloses a process for preparing aromatic di- and trisulfones from sodium sulfinate and various diaryl compounds.

German Offen. No. 3,616,063 discloses a process for making a polymeric aryl sulfone by copolymerization of an alkaline metal aryl disulfinate and chloronitrobenzene.

Vogel, H. A., *J. of Polymer Science*: Part A-1 Vol 8, 2035–2047 (1970) discloses the preparation of certain polyarylsulfones and structure property relationships. The disclosed method uses Lewis acid catalysts.

Sato et al, *Makromol. Chem., Rapid Commun.* 3, 821–4 (1982) discloses an aromatic polysulfone made by polycondensation of disodium 4,4'-oxydibenzenesulfinate with bis(4-chloro-3-nitro-phenyl) sulfone.

Sato, *Makromol. Chem., Rapid Commun.* 5, 151–155 (1984) discloses preparation of a polysulfone from 4,4'-oxydibenzenesulfinate with bis(chloromethyl) ketone.

Sato et al, *Makromol. Chem.* 185, 629–634 (1984) discloses preparation of a polysulfone from 4,4'-oxydibenzenesulfinate with 4-bromomethylbenzylbromide.

Hale et al, *J. of Polymer Science*: Part A-1 Vol 5, 2399–2414 (1967) discusses the polysulfone made from Bisphenol A and 4,4'-dichlorodiphenyl sulfone by nucleophilic aromatic substitution.

Encyclopedia of Polymer Science and Engineering, John Wiley & Sons, New York, N.Y. (1988) Vol. 13, pages 196–211 discusses polysulfones.

Lenz et al, *J. Polym. Sci.* 38, 351 (1962) discloses metal salts of 4-halothiophenols (i.e.,

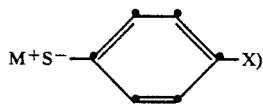

can be self-condensed to prepare linear poly(phenylene sulfide). However, no initiator is mentioned in this paper.

BRIEF DESCRIPTION OF THE DRAWING

The figure in the drawing is a plot of two thermographic analyses conducted on a product made by the process of this invention. The product was produced by the method of Example 2 given below. The plot shows the high thermal stability of the polysulfone product in air, and in nitrogen. More specifically, the plot shows that the polymer can be heated to a temperature of 500°–550° C., before significant weight loss occurs.

SUMMARY OF THE INVENTION

This invention comprises polysulfones, and the preparation thereof by an initiated self-condensation of a haloarylsulfinate salt. Thus, in one embodiment, this invention comprises as a composition of matter, a polysulfone consisting essentially of repeating units and end units, said repeating unit having the formula —Ar—$SO_2$—, such that the number of said repeating units by end group analysis is at least about eight, and one of said end units is halogen; and the other end unit is —$SO_2$—Ar—X, where X is a halogen conjugated with the —$SO_2$— group via said aromatic group Ar.

In another embodiment, this invention comprises preparation of such polysulfones by the self-condensation of a haloarylsulfinate salt, Ar—$SO_2^+M$, in the presence of a suitable initiator. More particularly, this invention comprises the discovery of a process for the preparation of a polysulfone, said process comprising the self-condensation of a reactant in the presence of an initiator for the self-condensation, said reactant having a leaving group and a sulfinate group conjugated by an aromatic group Ar, to which said leaving group and aromatic group are substituted, said sulfinate group having the formula —$SO_2M^+$, wherein M is an alkali metal, said initiator having a bridging group, selected from the carbonyl group and the sulfonyl group, bonded to two aromatic groups, each of which has a halogen in a position ortho or para to said bridging group, said process being conducted at a temperature sufficient to cause said self-condensation to take place.

The salt can, if desired, have only one aromatic ring. Thus, a 4-halophenylsulfinate salt, or a 2-halophenylsulfinate salt can be condensed by the process of this invention to yield a polymeric product. The initiator is an aromatic compound having both a leaving group and an activating group in a conjugated position. In a preferred embodiment, the initiator is a compound having two leaving groups on separate rings, both rings being bridged by a sulfonyl linkage. Activating materials of this type are illustrated by 4,4'-dihalodiphenylsulfones and 2,2'-dihalodiphenyl sulfones. Without being bound by any theory, the removal of a leaving group from the initiator creates an active site on which the polymerization first takes place. If the initiator has only one leaving group, then propagation will occur on one site of the initiator, and a moiety contributed by the initiator will occur at one end of the product chain. On the other hand, if the initiator has two leaving groups, then propagation can occur at two sites on the initiator, and the final product will contain, in its interior, a moiety contributed by the initiator. Thus, the number of leaving groups in the initiator will have an effect on the type of end group that appears on a product chain.

In principle, the process will proceed until there is no more haloarylsulfinate salt present in the reaction mixture. In other words, once the process is initiated, it should be able to proceed until the reactant is used up. In practice, it is possible to stop the reaction before it proceeds to that extent, by selection of an appropriate solvent in which the polymer product no longer dissolves, after a threshold molecular weight is reached.

The polymers produced by the process of this invention have high thermal stability. Thus, they may be used for preparing articles that are to be exposed to high temperatures. Articles can be produced from polymers of this invention by hot pressing or similar technique, optionally in the presence of a suitable binder. Materials of this invention can be employed for making articles exposed to steam and hot water. For example, they can be used in preparing parts for food sterilizers, microwave ovens, and the like. They can also be used in electrical and electronic applications.

DESCRIPTION OF PREFERRED EMBODIMENTS

In the description of the process of this invention above, the terms "leaving group" and "aromatic group" and "Ar" are used to describe the types of groups defined via such terminology, by skilled practitioners referring to aromatic nuclear substitution reactions of the types known in the art.

In addition to the process, this invention also comprises polysulfones characterized by having alternating sulfone and aromatic groups in a chain, such that the number of said sulfone groups and aromatic groups by end group analysis, is at least about eight. It will be understood that the chains of these new compositions of matter are solely composed of said aromatic and sulfonyl groups. In other words, the chains have repeating —Ar—SO$_2$— units in which Ar is an "aromatic group".

In a preferred embodiment, the process of this invention comprises the formation of polymers having an aryl sulfonyl group such as

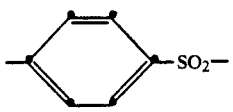

as a repeating unit. The polymers are produced by an initiated self-condensation of a halosulfinate salt. Preferred salts have the formula:

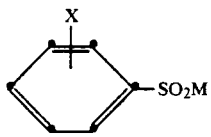

(I)

wherein X is a halogen selected from fluorine, chlorine, and bromine which is ortho or para to the —SO$_2$M group; and M is a metal or tetraalkyl ammonium. When M is a metal, it is preferably an alkali metal such as lithium, sodium, or potassium. When M is tetraalkylammonium, it is preferably —NR$_4$ wherein R is an alkyl group having up to about four carbon atoms. Preferably each R is the same, since compounds with such groups are more readily available. One of the R groups may be benzyl (—CH$_2$Ph); such compounds are commonly available.

Because of their availability, reactants of Formula I wherein M is sodium are preferred. Because of their reactivity, reactants where X is fluorine and chlorine are preferred. It is also preferred that the halo group be para to the sulfonyl linkage.

It will be recognized by a skilled practitioner that this invention need not be limited to use of the preferred classes of reactants set forth above. In this regard, M in Formula I may be any moiety having sufficient electropositive character to make the halosulfinate react under the reaction conditions employed. Thus, for example, it is suggested M can also be ammonium, NH$_4$+, or an alkaline earth metal such as magnesium, calcium, barium, strontium, and the like.

As indicated above, a skilled practitioner will recognize that the process of this invention is not limited to reactants having the aromatic system illustrated by Formula I. The process can be conducted using any reactant (or initiator) having an aromatic system that can be used in aromatic nucleophilic substitution reactions known in the art. Thus, the process of this invention can be conducted using reactants having a carbocyclic aromatic ring other than phenyl. For example, the process can employ reactants having a naphthyl ring system. In addition, the process of this invention can use reactants having a heterocyclic ring with suitable aromatic character. Thus, the process can employ reactants derived from pyrole, thiophene, furan, and other heterocyclic ring systems that are susceptible to aromatic nucleophilic substitutions.

To conduct the process of this invention, one or more sulfinate salts, such as reactant(s) having Formula (I), are heated in a solvent and in the presence of an initiator.

For the process, a temperature is employed which allows the reaction to proceed at a reasonable rate. Generally, a slightly elevated temperature is used. Temperatures within the range of from about 100° C. to about 200° C. can be employed. Temperatures somewhat outside this range can also be used, if desired. As explained more fully below, the reaction is preferably conducted in the presence of an organic solvent. Usually, the reaction temperature selected is below the normal boiling point of the solvent. Thus, it is preferred that the reaction be conducted at ambient pressure. It is to be understood, however, that the process can also be conducted at pressures below and above atmospheric pressure. For example, the reaction can be conducted at superatmospheric pressure when it is desired to conduct the process at a temperature above the normal boiling point of the solvent. Thus, pressures as high as 50 atmospheres or higher can be used, if desired.

From the above discussion, it will be clear to a skilled practitioner that the reaction pressure is not critical.

The reaction time is not a truly independent variable, and it is dependent at least to some extent on the inherent reactivity of the haloarylsulfinate salt and the initiator, and also on the reaction temperature used. In general, the higher the temperature and the more active the materials employed, the shorter the reaction time. Thus, the time of reaction is not critical so long as it is sufficient for reaction to take place. In general, the process is complete in from about 5 to about 50 hours. The time of reaction can be readily determined by a skilled practitioner using known techniques. In instances in which the product precipitates from solution, the onset or cessation of precipitation can be used to determine the duration of the polymerization reaction.

It is preferred that the polymerization process of this invention be initiated in the presence of a solvent. Preferably the solvent dissolves the haloarylsulfinate salt, the initiator, and the product to an appreciable extent. Of the solvents which can be used, dipolar aprotic solvents are employed. Such materials may be selected from solvents of this type that have been used in the art for aromatic nuclear substitutions. Suitable polar liquids include dimethylacetamide, diethylacetamide, N-methyl pyrrolidone, dialkylsulfoxides such as dimethylsulfoxide, diaryl sulfoxides, diaryl sulfones, nitriles such as benzonitrile, hexamethylphosphoramide, and the like. Mixtures of such materials can be used.

The amount of liquid employed is not critical. In general, one employs enough liquid to dissolve the product(s) and reactant(s) to an appreciable extent. There is no real upper limit on the amount of liquid employed. This is generally influenced by the size of the reaction vessel, process economics, and similar secondary considerations.

It is not necessary that the same liquid be present throughout the process. For example, one may switch from one liquid to another, say by adding a second liquid and removing one that was initially present. Thus, for example, one may wish to change the liquid reaction medium (a) because it is too volatile at an increased reaction temperature used at a latter stage of the process, or (b) when the solvent becomes incapable of dissolving the product being produced.

It is to be understood that the use of a solvent is a preferred process expedient for this invention, but the presence of a solvent is not a critical feature. For example, an operator may wish to begin the process in the presence of a solvent, and later on continue the process in the substantial absence of a solvent, i.e., in the melt.

The process of this invention is conducted in the substantial absence of water. In other words, the process is conducted under substantially anhydrous conditions. Stated another way, a skilled practitioner (familiar with other aromatic nuclear substitutions) will appreciate that the process of this invention is conducted under substantially dry conditions in order to improve the yield of desired product. Thus, one may wish to conduct the process using expedients known in the art to minimize the adverse effect of water. For example, an operator may wish to add toluene (and the materials to be employed) to the reaction zone, and then remove water that is present, by azeotropic distillation of the toluene. After the toluene is removed by distillation, the reaction mixture can be taken up to the desired reaction temperature. This expedient is exemplified in Example 2.

The process of this invention is facilitated by the presence of an initiator. The initiator provides a means for the polymerization to take place. The initiator is an aromatic compound which contains at least one leaving group and one activating group. Halogen substituents are examples of leaving groups. Preferred leaving groups are fluorine, chlorine, and bromine, i.e., halogens having an atomic number not greater than 35. Of these, fluorine and chlorine are more preferred. The leaving group is in conjugated relationship, i.e., ortho or para to the activating group. As explained above, activators with only one leaving group provide one active site and a moiety at an end of a polymer chain. Activators with two leaving groups provide two active sides and a moiety within a product polymeric chain.

It is preferred that the initiator have:
(a) two leaving groups,
(b) two aryl rings,
(c) an activating group bridging the aryl rings,
(d) one of the leaving groups being bonded to each aryl ring, such that
(e) both leaving groups are ortho or para to the bridging activating group.

Of the molecules of this type, it is preferred that the bridging group be carbonyl,

or sulfonyl, —SO$_2$—. More preferably, the bridging group is sulfonyl.

One class of initiators that has the above structural characteristics has the formula:

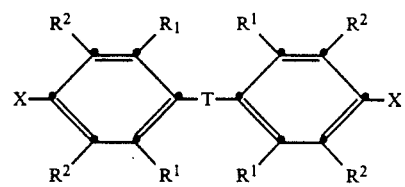

Another class of initiators that has the above structural characteristics has the formula:

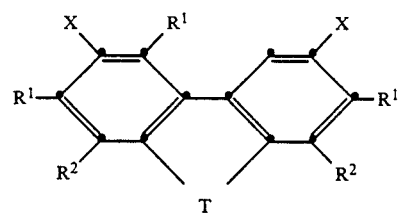

In Formulas (II) and (III), X is a leaving group such as —NO$_2$, or halogen selected from fluorine, chlorine, and bromine, or aryloxide, such as phenoxide, or any other common leaving group, T is selected from

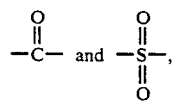

R$^1$ is selected from hydrogen and electron withdrawing groups, e.g., —NO$_2$, —CN, and CO$_2$R$^3$ wherein R$^3$ is an alkyl group of up to about eight carbons or more, or aryl group having up to about 10 carbon atoms, and R$^2$ is selected from R$^3$, X, and R$^1$ groups. It is to be understood that the groups represented by R$^2$ in the above formula can be any substituent known in the art to be an electron withdrawing group, and the substituents represented by R$^2$ can be selected from any inert group employed, i.e., any group which (a) does not decompose, or (b) enter into an unwanted side reaction to an appreciable extent, or (c) otherwise interfere with the process of the invention via steric hindrance or other mechanism, while being subjected to the reaction conditions employed.

Examples of initiators which can be employed in this invention are:
4,4'-difluorodiphenylsulfone,
4,4'-dichlorodiphenylsulfone,
4-fluorophenyl(phenyl)sulfone,
4-chlorophenyl(phenyl)sulfone, and the analogous compounds wherein the sulfone group is replaced with a carbonyl group or sulfoxide group.

The following and similar compounds can also be used as initiators:
4-fluoronitrobenzene, 4-chloronitrobenzene, 4-fluorobenzonitrile, 4-chlorobenzonitrile, 1,4-dinitrobenzene, (4-fluorophenyl)methyl sulfone, and (4-chlorophenyl)methyl sulfone.

Of these, initiators having Formula (II) are preferred. In many instances, it is also preferred that Y be —SO$_2$— rather than

so that the —SO$_2$— linkage appears in the moiety contributed to the polymer by the initiator.

A key feature of this invention is the small amount of initiator that is employed. The initiator is used in an amount which is much less than the amount that would be required if the initiator was used as a co-monomer. Thus, the amount of initiator employed is only a small mole fraction of the amount of haloaryl sulfinate salt. One uses enough initiator to get the reaction started, and does not use more than enough initiator than that required to afford the desired result. In this regard, it will be apparent to a skilled practitioner that the amount of initiator used can have an effect on the molecular weight of the product. More specifically, the number of active sites on which chain growth can take place depends, at least to some extent, on the amount of initiator that is present. Thus, if the initiator provides many active sites, many polymer chains can be started. On the other hand, if fewer active sites are provided, a smaller number of polymer chains will be started, and each of them will have the opportunity to grow to a longer size than if many more active sites were present. By routine experimentation wholly within the skill of the art, a skilled practitioner can determine the effect of initiator concentration on product molecular weight, in the system and under the reaction conditions employed, and then select an initiator concentration to be used. The number average molecular weight of the product can be determined by end group analysis.

In light of the above, one generally employs an amount of initiator which is from about 0.005 to about 0.10 mole per mole of haloaryl sulfinate salt. Amounts somewhat outside this range can be employed.

The initiator amount range given above is generally applicable for reactions conducted in solution. If the reaction is conducted in the melt, the operator may need to make an adjustment in the amount of initiator to facilitate good contact between the initiator and the reactant.

As stated above, when the initiator has two active sites, chain propagation can begin at both sides and the moiety contributed by the initiator will appear within the interior of the product chain. This is illustrated by the following representation of the structural formula of a product of this invention:

$$X-[Ar-SO_2]_{n_1}Y-[SO_2-Ar]_{n_2}Ar-X \qquad (IV)$$

In this formula, X is a halogen as discussed above, and Y is a bridging group obtained by removal of two halogens from an initiator. The group —Ar—SO$_2$— is the repeating unit conferred by the haloarylsulfinate salt, X—Ar—SO$_2$M, which is self-condensed. The group Ar is an aromatic group, such as a phenyl radical or a substituted phenyl, naphthyl, or a heterocyclic radical having aromatic character. The integers $n_1$ and $n_2$ indicate how many repeating units there are on both sides of the moiety Y. If the reactivity of both leaving groups was the same, or about the same, then it will be expected that the value of $n_1$ and $n_2$ will be the same or about the same.

The group Ar can be any aryl group capable of undergoing the type of reaction provided by this invention. Preferably it has only one phenyl ring. It may contain an activating group, such as those mentioned above; however, such substitution is not required. In other words, as set forth in the Examples below, a haloarylsulfinate salt that does not have an activating group can be reacted according to the process of this invention.

The self-condensation of sulfinate salts that do not have activating groups attached to the ring is a preferred embodiment of this invention. Hence, a preferred embodiment of this invention comprises the formation of a polysulfone having the formula:

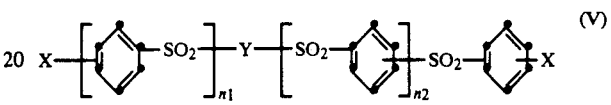

wherein X, Y, $n_1$, and $n_2$ are as defined above. In the polymer, the sulfinyl linkages and the halogens are ortho or para to one another, and the sum of $n_1$ and $n_2$, as determined by end group analysis, is equal to at least about eight. These materials are prepared by heating an ortho- or para-haloarylsulfinate salt having Formula (I) to self-condense the salt. The self-condensation is conducted in the presence of an initiating amount of an initiator having a bridging group selected from sulfinyl and carbonyl between two phenyl groups, each of which has a halogen (X—) in a position ortho or para to the bridging group. Preferably the phenyl groups are isolated; that is, they are not part of a fused ring system. In other words, it is preferred that the phenyl group not share two carbons with another aromatic ring. Preferred initiators have Formulas (II) or (III). Of these, initiators of Formula (II) are preferred.

EXAMPLE 1

Preparation of Poly(4-phenylsulfone) from Sodium 4-fluorophenyl Sulfinate

A mixture of 5.00 g of 4-fluorobenzene sulfinic acid, sodium salt, and 0.12 g of 4,4'-difluorodiphenylsulfone in 35 ml of dimethylsulfoxide was heated at 175°±2° C. for 12 hours with stirring, while protecting from moisture. The resulting mixture became homogeneous after a few minutes of heating, then a precipitate gradually formed. The reaction mixture was cooled and poured into 200 ml of water. A cream-colored precipitate resulted. It was filtered, washed thoroughly with water, and air-dried. Thereafter, the air-dried precipitate was washed with methylene chloride; the insoluble material was collected and dried under vacuum at 100° C.

Elemental analysis (48.92% C, 2.86% H, 22.35%) and comparison of the NMR spectrum with the spectrum of

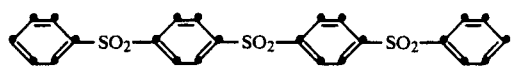

confirmed that the product was a polymer of 4-phenylsulfone. Thermogravimetric analysis in nitrogen showed onset at 517° C., midpoint 560° C., and residue of 35% of 1000° C. In air, onset was at 555° C., midpoint 620° C., and residue of 3% at 1000° C. DSC showed no transitions below 500° C.

Mass spectrographic analysis of the product showed that it was only contaminated with trace impurities.

The process of this invention is illustrated by the following non-limiting Example:

EXAMPLE 2

Poly(4-phenylenesulfone) from Sodium 4-fluorophenyl Sulfinate

A 10.0 g (45.8 mmol) sample of sodium 4-fluorophenyl sulfinate dihydrate was dried by azeotropic distillation with 50 mL of toluene for 24 hours with continuous removal of water. The toluene was removed at reduced pressure, and 0.24 g (0.92 mmol) of sublimed 4-fluorophenylsulfone and 50 mL of dry dimethylsulfoxide were added. The mixture was stirred and gradually heated to 175° C. with an oil bath, and a homogeneous solution formed. The reaction mixture was held at 175° C. for 24 hours and a white precipitate formed. After cooling, the reaction mixture was poured into 250 mL of vigorously stirred water. The resulting precipitate was filtered on a fine glass frit and washed successively with water, methanol, and dichloromethane. After drying in vacuo at 100° C. for 24 hours, 6.4 g (100%) of a cream-colored solid was obtained.

IR (KBr) 3090, 1325, 1290, 1162, 1105, 640. Solid state CP/MAS $^{13}$C NMR (25.2 MHz) δ 131.3, 145.4. X-Ray powder diffraction (CuKα) d-spacings (Å) 15.4, 5.40, 4.13, 3.367, 2.921, 2.813, 2.503, 2.368, 2.203, 2.007, 1.851. Estimated degree of crystallinity: 90%. ANAL. Calcd. for $C_6H_4O_2S$: C, 51.42; H, 2.88; S, 22.88. Found: C, 50.57; H, 2.70; S, 21.95; F, 2.49; Na: 0.72. The number average molecular weight calculate from the elemental analysis is 2180. This value represents about 16 repeat units.

The process of the above Example can be repeated at a temperature within the range of from about 100° C. to about 200° C., using a dipolar, aprotic solvent such as dimethylacetamide, diethylacetamide, diphenylsulfone, benzonitrile, and the like. The amount of the solvent employed can be from about an equal weight amount of the sulfinate salt, to about 20 times the weight of the salt. The process can be essentially repeated as discussed above using a reaction time of about 5 to about 50 hours and a reaction pressure of from 1 to 100 atmospheres. The sodium 4-fluorophenyl sulfinate can be substituted by analogous compounds such as the analogous 4-bromo- and 4-chloro-compounds, and the 2-fluoro-, 2-bromo-, and 2-chloro-analogs. Likewise, such compounds may be substituted in a position ortho to the halogen substituent with an activating group such as nitro, cyano, and the like. These reactants may have, instead of a sodium cation, a potassium cation, or the like such as tetrabutylammonium or tetramethylammonium group. Similar results will be obtained when the above modifications of the process are made using from about 0.005 to 0.10 mole percent of an initiator selected from those having Formula III or Formula IV.

COMPARATIVE EXAMPLE

Poly(4-phenylenesulfone) from Sodium 4-fluorophenylsulfinate Without Initiator

The above procedure was carried out, but difluorodiphenylsulfone was omitted. The yield of polymer was only 0.59 g (9%); nevertheless the decomposition onset temperatures were very high (538° C. in air and 475° C. in nitrogen) indicating that some polymer was formed.

The invention has been described in detail above with particular reference to preferred embodiments. A skilled practitioner familiar with the above description can make many changes and substitutions without departing from the scope and spirit of the appended claims.

We claim:

1. A process for the preparation of a polysulfone, said process comprising the self-condensation of a reactant in the presence of an initiator for the self-condensation,
    said reactant having a leaving group and a sulfinate group conjugated by an aromatic group Ar, to which said leaving group and aromatic group are substituted, said sulfinate group having the formula —$SO_2M^+$, wherein M is an alkali metal,
    said initiator having a bridging group, selected from the carbonyl group or the sulfonyl group, bonded to two aromatic groups, each of which has a halogen in a position ortho or para to said bridging group,
    said process being conducted at a temperature sufficient to cause said self-condensation to take place.

2. Process for the preparation of a polysulfone having the formula:

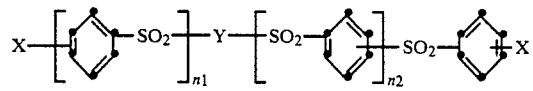

wherein X is fluorine, chlorine or bromine, $n_1$ and $n_2$ are whole numbers such that the value of ($n_1$ and $n_2$) by end group analysis is at least about six, and Y is a bridging group obtained by removal of two halogens from an initiator defined below;
    said process comprising heating a solution of an ortho- or para-halosulfinate salt to a reaction temperature sufficient to cause said salt to polymerize in the presence of an initial quantity of an initiator;
    said halosulfinate salt having the formula:

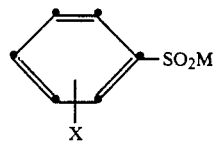

wherein X is selected from the halogens set forth above, and M is lithium, sodium, potassium; or tetraalkyl ammonium; said initiator having a bridging group selected from

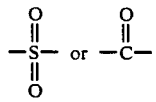

bonded to two isolated phenyl groups, each of which has a halogen X in a position ortho or para to said bridging group;
    said initiating quantity being an amount sufficient to initiate the reaction, and less than about 0.10 mole percent, based on the amount of said sulfinate.

3. Process according to claim 2 wherein said salt is a para-halosulfinate.

4. Process according to claim 3 wherein said salt is a para-halo sodium sulfinate.

5. Process according to claim 2 wherein said salt is dissolved in a dipolar aprotic solvent.

6. Process according to claim 5 wherein said solvent is dimethylsulfoxide.

7. Process according to claim 2 wherein said temperature is within the range of from about 100° C. to about 200° C.

8. Process according to claim 2 wherein said initiator has the formula:

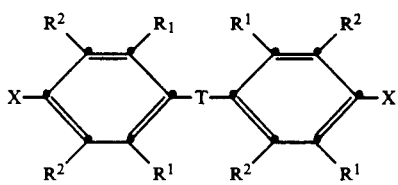

or the formula:

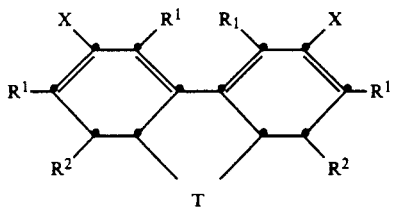

wherein X is chlorine or bromine, T is selected from

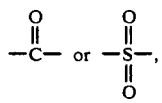

$R^1$ is hydrogen or an electron withdrawing hydrogen or an electron withdrawing group, and $R^2$ is selected from $R^1$, X, or alkyl groups having up to about eight carbon atoms.

9. Process of claim 8 wherein said activator is 4-fluorophenylsulfone.

10. Process for the preparation of poly(4-phenylenesulfone) said process comprising polymerizing sodium 4-fluorophenylsulfinate in dimethylsulfoxide at a temperature of 175°±10° C., and in the presence of an activator quantity of 4,4'-difluorodiphenylsulfone whereby said poly(4-phenylsulfone) product, by end group analysis has a number average of about 16 monomer units per chain.

11. Process for the preparation of a polysulfone, said process comprising the self-condensation of a reactant in the presence of an initiator for the self-condensation,
  said reactant having a leaving group and a sulfinate group conjugated by an aromatic group to which said leaving group and aromatic group are substituted, said sulfinate group having the formula $—SO_2M^2$, wherein M is an alkali metal,
  said initiator having a bridging group, selected from the carbonyl group or the sulfonyl group, bonded to two aromatic groups, each of which has a halogen in a position ortho or para to said bridging group;
  said process being conducted at a temperature sufficient to cause said self-condensation to take place.

* * * * *